(12) United States Patent
Lee et al.

(10) Patent No.: US 10,770,228 B2
(45) Date of Patent: Sep. 8, 2020

(54) CAPACITOR INCLUDING ELECTRODES HAVING COMPLEMENTARY PATTERN FORMED IN HORIZONTAL DIRECTION

(71) Applicant: LG CHEM, LTD., Seoul-si (KR)

(72) Inventors: Jeong Woo Lee, Daejeon (KR); Chan Ki Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 232 days.

(21) Appl. No.: 15/896,288

(22) Filed: Feb. 14, 2018

(65) Prior Publication Data
US 2018/0233283 A1 Aug. 16, 2018

(30) Foreign Application Priority Data
Feb. 14, 2017 (KR) .................. 10-2017-0019867

(51) Int. Cl.
H01G 4/01 (2006.01)
H01G 2/10 (2006.01)
H01G 4/224 (2006.01)
H01G 9/08 (2006.01)
H01G 4/02 (2006.01)
H01G 9/04 (2006.01)
H01G 11/82 (2013.01)
(Continued)

(52) U.S. Cl.
CPC ............. *H01G 4/01* (2013.01); *H01G 2/106* (2013.01); *H01G 4/02* (2013.01); *H01G 4/224* (2013.01); *H01G 9/04* (2013.01); *H01G 9/08* (2013.01); *H01G 11/12* (2013.01); *H01G 11/76* (2013.01); *H01G 11/78* (2013.01); *H01G 11/82* (2013.01); *H01G 11/00* (2013.01); *Y02E 60/13* (2013.01)

(58) Field of Classification Search
CPC .. H01G 4/01; H01G 4/02; H01G 9/04; H01G 9/08
See application file for complete search history.

(56) References Cited

U.S. PATENT DOCUMENTS 8,759,893 B2 6/2014 Cho
9,548,475 B2 1/2017 Kang et al.
(Continued)

FOREIGN PATENT DOCUMENTS

JP 2009-253020 A 10/2009
KR 2013-0027404 A 3/2013
(Continued)

OTHER PUBLICATIONS

Office Action dated May 21, 2019, issued in counterpart Korean Patent Application No. 10-2017-0019867.

*Primary Examiner* — Matthew T Martin
(74) *Attorney, Agent, or Firm* — Morgan, Lewis & Bockius LLP

(57) ABSTRACT

A capacitor includes an electrode assembly, having at least one positive electrode, at least one negative electrode, and at least one dielectric or separator interposed between the positive electrode and the negative electrode, and a case for receiving the electrode assembly. The electrode assembly is configured such that the positive electrode, the negative electrode, and the dielectric or the separator are arranged in a horizontal direction, which is perpendicular to the thickness direction of the electrode assembly, and such that the positive electrode and the negative electrode have a complementary pattern.

9 Claims, 7 Drawing Sheets

(51) Int. Cl.
*H01G 11/76* (2013.01)
*H01G 11/78* (2013.01)
*H01G 11/12* (2013.01)
*H01G 11/00* (2013.01)

(56) References Cited

U.S. PATENT DOCUMENTS

2013/0056853 A1* 3/2013 Cho ................ H01L 23/5223
  257/534
2015/0303002 A1 10/2015 Yun et al.

FOREIGN PATENT DOCUMENTS

KR 10-2013-0124622 A 11/2013
KR 10-1595337 B1 2/2016

\* cited by examiner

CAPACITOR INCLUDING ELECTRODES HAVING COMPLEMENTARY PATTERN FORMED IN HORIZONTAL DIRECTION

The present application claims the benefit of Korean Patent Application No. 10-2017-0019867 filed in Korea on Feb. 14, 2017, which is hereby incorporated by reference.

BACKGROUND

Technical Field

The present invention relates to a capacitor including electrodes having a complementary pattern formed in a horizontal direction.

Discussion of the Related Art

In general, an electrochemical energy storage device is a core component of a finished product device that is essentially used in all kinds of portable information communication equipment and electronic equipment. In addition, the electrochemical energy storage device is expected to be definitely used as a high-quality energy source in the field of new and renewable generation energy, which is applicable to future electric vehicles and portable electronic devices.

An example of such an electrochemical energy storage device is an electrochemical capacitor, which has attracted considerable attention as a next generation battery that follows a lithium ion battery, since the electrochemical capacitor has a long lifespan, a short charging time, and high electrical efficiency.

A battery, which is one of the most generalized energy storage devices, is used for various purposes, since the battery is capable of storing a considerably large amount of energy while the battery has a relatively small volume and weight and is capable of providing output appropriate for various purposes. However, the battery commonly has problems in that the storage characteristics of the battery are low and the charge cycle of the battery is short, irrespective of the kind of battery.

The above problems occur due to deterioration of chemical materials contained in the battery over time or due to the long-term use thereof. On the other hand, the capacitor uses a charging phenomenon based on simple movement of ions at the interface between an electrode and an electrolyte or a surface chemical reaction. Consequently, the capacitor has attracted considerable attention as a next generation energy device that can be used as an auxiliary battery or an alternative battery, since the capacitor can be charged and discharged at a high speed and exhibits high charge and discharge efficiency and semi-permanent charge cycle characteristics.

In addition, the resistance of the capacitor is low, whereby the capacitor has high output density. Furthermore, the capacitor has a short response time. Consequently, the capacitor is mounted in a variety of devices in order to perform various functions even though the capacitor has a small capacity.

The capacitor is manufactured to have a structure in which electrodes and a dielectric are stacked in a cylindrical case or a prismatic case, and is mounted in a device.

FIG. 1 is a vertical sectional view schematically showing a related art capacitor.

Referring to FIG. 1, the capacitor is configured to have a structure in which positive electrodes 12 and negative electrodes 13 are alternately stacked in the vertical direction in the state in which dielectrics 14 are interposed respectively between the positive electrodes 12 and the negative electrodes 13 in order to constitute a stack 11 and in which the stack 11 is mounted in a case of the capacitor. The uppermost electrode 12a of the stack 11 is a positive electrode, and the lowermost electrode 13a of the stack 11 is a negative electrode. The uppermost positive electrode 12a and the lowermost negative electrode 13a are connected respectively to an external positive electrode input and output terminal 14 and an external negative electrode input and output terminal 15, each of which protrudes outward from the case.

In recent years, the space in devices has become too small to receive the capacitor due to a reduction in the size and thickness of the devices. As a result, the size of the capacitor has been gradually decreased, and there is an urgent necessity for an ultra-thin film capacitor.

In the related art capacitor structure, however, it is difficult to reduce the thickness of the capacitor.

Therefore, there is an urgent necessity for a capacitor having a structure that is capable of exhibiting high efficiency even within a limited volume based on a very small thickness due to a reduction in the thickness of devices.

SUMMARY

The present invention has been made to solve the above problems and other technical problems that have yet to be resolved.

An object of the present invention to provide a capacitor configured to have a structure in which a positive electrode, a negative electrode, and a dielectric or a separator, which constitute the capacitor, are arranged in a horizontal direction, which is perpendicular to the thickness direction of the capacitor and in which the positive electrode and the negative electrode are formed such that the positive electrode and the negative electrode have a complementary pattern in order to increase the area between the positive electrode and the negative electrode, whereby the number of reaction points is increased and thus reaction efficiency is maximized within a limited volume.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, A capacitor comprises an electrode assembly comprising at least one positive electrode, at least one negative electrode, and at least one dielectric or separator interposed between the positive electrode and the negative electrode; and a case for receiving the electrode assembly, wherein the electrode assembly is configured such that the positive electrode, the negative electrode, and the dielectric or the separator are arranged in a horizontal direction, which is perpendicular to a thickness direction of the electrode assembly, and such that the positive electrode and the negative electrode have a complementary pattern.

It is to be understood that both the foregoing general description and the following detailed description are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Now, exemplary embodiments of the present invention will be described in detail with reference to the accompanying drawings. It should be noted, however, that the illustrated embodiments are given for easier understanding of the present invention, and thus the scope of the present invention is not limited by the illustrated embodiments.

In the following drawings, an electrode assembly and a case of a capacitor, excluding other general components of the capacitor, are schematically shown for the convenience of description.

Figure 1:
FIG. 1 is a top view showing an electrode assembly of a related art capacitor.
Figure 2:
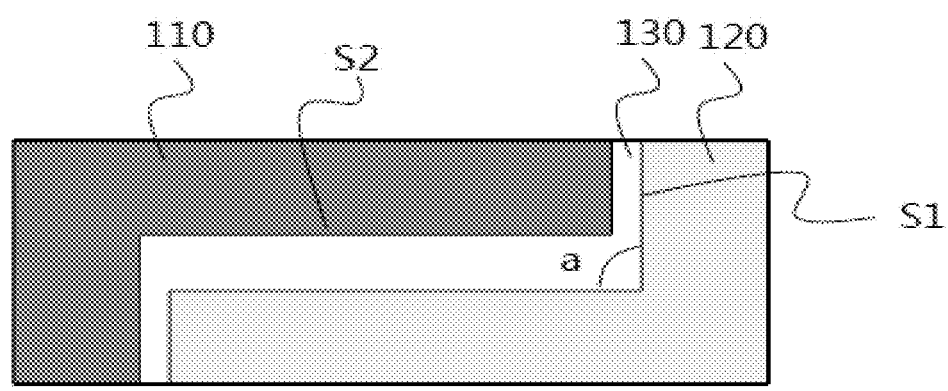
FIG. 2 is a see-through top view showing a capacitor according to an embodiment of the present invention.
Figure 3:
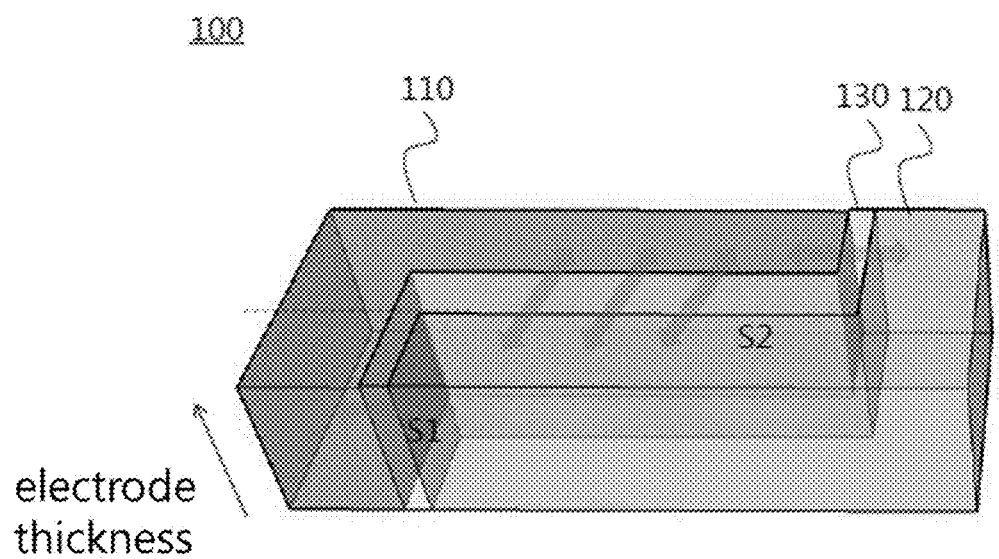
FIG. 3 is a perspective view showing an electrode assembly of FIG. 2.

FIGS. 2 and 3 are respectively a top view and a perspective view of an electrode assembly of a capacitor according to an embodiment of the present invention, more definitely showing the effects of the capacitor.

Referring to FIGS. 2 and 3, the electrode assembly of the capacitor, denoted by reference numeral 100, according to the present invention may include a positive electrode 110, a negative electrode 120, and a dielectric 130 interposed between the positive electrode 110 and the negative electrode 120. The positive electrode 110, the dielectric 130, and the negative electrode 120 are arranged in the horizontal direction. FIGS. 2 and 3 are schematic views showing the structure of the electrode assembly in a case 140. Although the external structure of the electrode assembly is not shown, the positive electrode 110 and the negative electrode 120 are connected respectively to an external positive electrode input and output terminal and an external negative electrode input and output terminal, each of which protrudes outward from the case 140.

In the above structure, the thickness of the capacitor may be the same as the thickness of each of the electrodes. Consequently, it is possible to reduce the thickness of the capacitor by reducing the thickness of each of the electrodes, whereby it is possible to manufacture a desired ultra-thin capacitor.

Furthermore, the positive electrode 110 and the negative electrode 120 have a complementary pattern, for example, a complementary deletion portion. The positive electrode 110 and the negative electrode 120 are arranged in the state of being fitted into the deletion portion. As a result, the positive electrode 110 and the negative electrode 120 are formed so as to have shapes of a "]" and "[" respectively, when reflected in a mirror.

That is, each of the positive electrode 110 and the negative electrode 120 is formed in a shape in which a rectangle having a size smaller than the size of each of the positive electrode 110 and the negative electrode 120 (indicated by a blue dotted line) is cut from the part of a rectangle at which two edges of the rectangle are connected to each other.

Consequently, each of the positive electrode 110 and the negative electrode 120 has two first facing portions S1 configured to face a first direction, which is the longitudinal direction of the capacitor, and one second facing portion S2 configured to face a second direction, which is the lateral direction of the capacitor and which is perpendicular to the first direction, e.g., which is inclined at an angle of 90 degrees with respect to the first direction, as indicated by reference symbol a.

Here, as can be seen from FIG. 3, each of the first direction and the second direction is a horizontal direction, which is perpendicular to the thickness direction of the electrode assembly of the capacitor 100, e.g., which is inclined at an angle of 90 degrees with respect to the thickness direction of the electrode assembly of the capacitor 100.

Meanwhile, an electrochemical reaction occurring in the electrode assembly of the capacitor 100 is indicated by red arrows.

For example, the positive electrode 110 and the negative electrode 120 face each other in the first direction and the second direction in the state in which the dielectric 130 is interposed between the positive electrode 110 and the negative electrode 120. The electrochemical reaction (indicated by the red arrows) occurs between the facing portions S1 of the positive electrode 110 and the negative electrode 120 and between the facing portions S2 of the positive electrode 110 and the negative electrode 120.

The electrochemical reaction speed depends on the width of the dielectric 130 and the area of the facing portions S1 and S2. As the area of the facing portions S1 and S2 increases, a reaction area increases, e.g., the number of reaction points increases, whereby reaction efficiency is improved. As the area of the facing portions S1 and S2 decreases, on the other hand, a reaction speed increases.

Since the positive electrode 110 and the negative electrode 120 of the capacitor 100 according to the present invention have a complementary pattern, the reaction area in the same volume is larger than in the case in which the positive electrode 110 and the negative electrode 120 are simply arranged in the horizontal direction.

In addition, since a reaction occurs between the facing portions S1 of the positive electrode 110 and the negative electrode 120 and between the facing portions S2 of the positive electrode 110 and the negative electrode 120 in the state in which the dielectric 130 is interposed between the positive electrode 110 and the negative electrode 120, the response speed may increase as the width of the dielectric 130 is decreased. However, the width of the dielectric 130 may be appropriately selected in consideration of the size and safety of a device. For example, the width of the dielectric 130, which is the distance between the positive electrode 110 and the negative electrode 120, may range from 10 μm to 1000 μm.

The structures of capacitors according to other embodiments of the present invention are schematically shown in top views of FIGS. 4 to 7.

Figure 4:
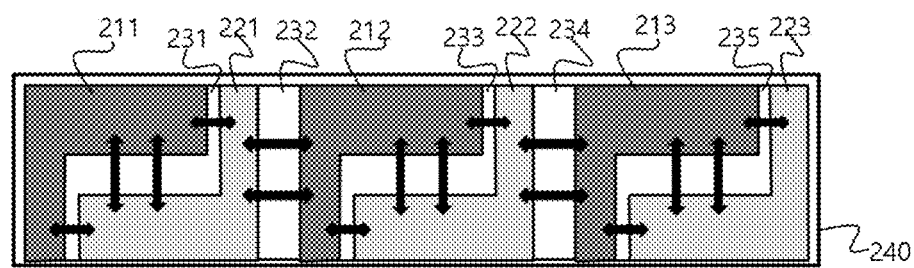
FIG. 4 is a see-through top view showing a capacitor according to another embodiment of the present invention.

Referring first to FIG. 4, a positive electrode 211 and a negative electrode 221 are arranged in the state in which a dielectric 231 is interposed between the positive electrode 211 and the negative electrode 221, in the same manner as shown in FIG. 2, in order to constitute a basic unit 201. Three basic units 201 are arranged in the horizontal direction in the state in which dielectrics 232 and 234 for separating the negative electrode and the positive electrode from each other are further interposed respectively between the basic units 201.

On the whole, therefore, a positive electrode 211, a dielectric 231, a negative electrode 221, a dielectric 232, a positive electrode 212, a dielectric 233, a negative electrode 222, a dielectric 234, a positive electrode 213, a dielectric 235, and a negative electrode 223 are arranged in the horizontal direction. The positive electrode 211 and the negative electrode 221 have a complementary deletion portion, the positive electrode 212 and the negative electrode 222 have a complementary deletion portion, and the positive electrode 213 and the negative electrode 223 have a complementary deletion portion. Meanwhile, electrodes of two adjacent basic units that face each other, e.g., the negative electrode 221 and the positive electrode 212, face each other in a straight line, rather than through the complementary patterns. In addition, the negative electrode 222 and the positive electrode 213 face each other in a straight line, rather than through the complementary patterns.

In the above structure, an electrochemical reaction occurs between the facing portions of the positive electrodes 211, 212, and 213 and the negative electrodes 221, 222, and 223. This electrochemical reaction is indicated by red arrows.

For example, in the structure shown in FIG. 4, a number of reaction points that is equal to the number of reaction points in FIG. 2 may be provided in each of the basic units. Additionally, the basic units face each other only through facing portions that face the first direction, whereby an electrochemical reaction occurs only in one direction.

Comparing FIGS. 2 and 4, in the case in which a plurality of positive electrodes 211, 212, and 213 and a plurality of negative electrodes 221, 222, and 223 are alternately arranged to manufacture a capacitor, the reaction area is larger than in the case in which a positive electrode and a negative electrode are provided in the same volume. Consequently, the structure shown in FIG. 4 is more efficient.

Meanwhile, although not shown, the outermost electrodes, e.g., the positive electrode 211 and the negative electrode 223, are connected respectively to an external positive electrode input and output terminal and an external negative electrode input and output terminal, each of which protrudes outward from a case 240, in the same manner as shown in FIG. 2. The positive electrodes 212 and 213 and the negative electrodes 221 and 222, which are located between the positive electrode 211 and the negative electrode 223, are not connected to the external input and output terminals.

Consequently, only the outermost electrodes may be connected to the outside, and the electrodes between the outermost electrodes may be separated from each other in the state in which the respective dielectrics are interposed therebetween.

Figure 5:
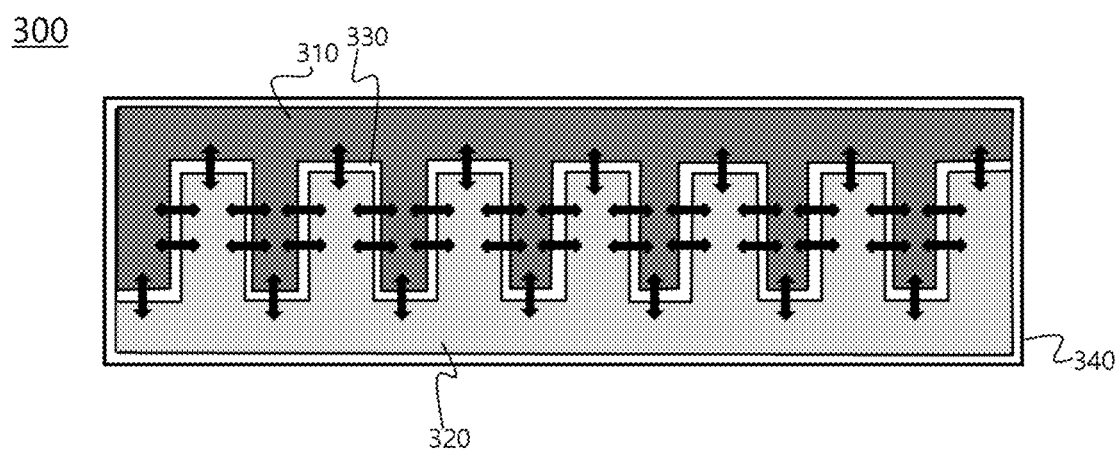
FIG. 5 is a see-through top view showing a capacitor according to another embodiment of the present invention.

Referring now to FIG. 5, a structure in which only a single positive electrode 310 and a single negative electrode 320 are arranged such that a large reaction area is provided therebetween is shown.

That is, a capacitor 300 is configured to have a structure in which each of the positive electrode 310 and the negative electrode 320 is provided with a plurality of deletion portions such that the positive electrode 310 and the negative electrode 320 can be engaged with each other in the form of sawteeth. Consequently, the reaction area may be larger for a given volume than the capacitor 200 shown in FIG. 2, in which a single deletion portion is provided.

An electrochemical reaction occurring in the above structure is indicated by red arrows. The capacitor 300 has a plurality of first facing portions that face the first direction and a plurality of second facing portions that face the second direction. The electrochemical reaction occurs between the facing portions of the capacitor 300.

Although the external structure of the capacitor is not shown in FIG. 5, the positive electrode 310 and the negative electrode 320 are connected respectively to an external positive electrode input and output terminal and an external negative electrode input and output terminal, each of which is exposed outward from a case 340.

Figure 6:
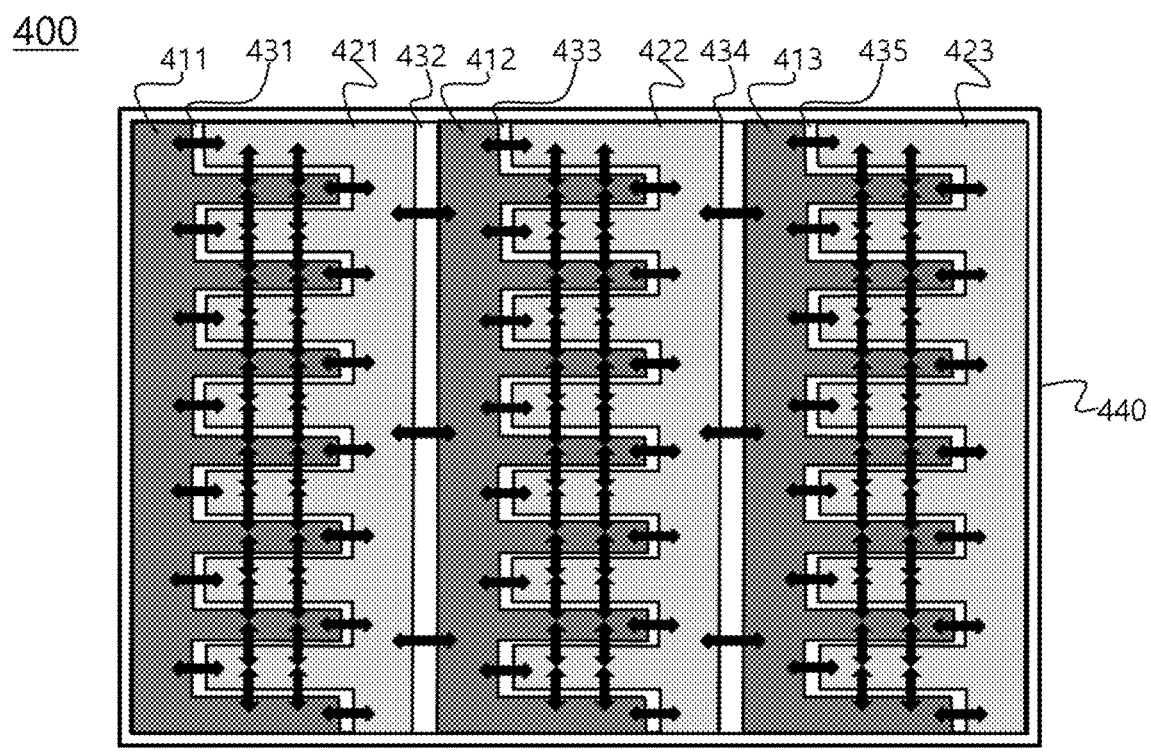
FIG. 6 is a see-through top view showing a capacitor according to another embodiment of the present invention.

FIG. 6 shows a capacitor 400, which is configured to have a structure in which a plurality of electrode assemblies, one of which is shown in FIG. 5, is arranged in the horizontal direction.

Referring to FIG. 6, a positive electrode 411 and a negative electrode 421 are arranged in the state in which a dielectric 431 is interposed between the positive electrode 411 and the negative electrode 421, in the same manner as shown in FIG. 5, in order to constitute a basic unit. Three basic units are arranged in the horizontal direction in the state in which dielectrics 232 and 234 for separating the negative electrode and the positive electrode from each other are further interposed respectively between the basic units.

On the whole, therefore, a positive electrode 411, a dielectric 431, a negative electrode 421, a dielectric 432, a positive electrode 412, a dielectric 433, a negative electrode 422, a dielectric 434, a positive electrode 413, a dielectric 435, and a negative electrode 423 are arranged in the horizontal direction. The positive electrode 411 and the negative electrode 421 have a complementary sawtooth pattern, the positive electrode 412 and the negative electrode 422 have a complementary sawtooth pattern, and the positive electrode 413 and the negative electrode 423 have a complementary sawtooth pattern. Meanwhile, electrodes of two adjacent basic units that face each other, e.g., the negative electrode 421 and the positive electrode 412, face each other in a straight line, rather than through the complementary patterns. In addition, the negative electrode 422 and the positive electrode 413 face each other in a straight line, rather than through the complementary patterns.

In the above structure, an electrochemical reaction occurs between the facing portions of the positive electrodes 411, 412, and 413 and the negative electrodes 421, 422, and 423. This electrochemical reaction is indicated by red arrows.

Although the external structure of the capacitor is not shown in FIG. 6, the outermost electrodes, e.g., the positive electrode 411 and the negative electrode 423, are connected respectively to an external positive electrode input and output terminal and an external negative electrode input and output terminal, each of which protrudes outward from a case 440.

Figure 7:
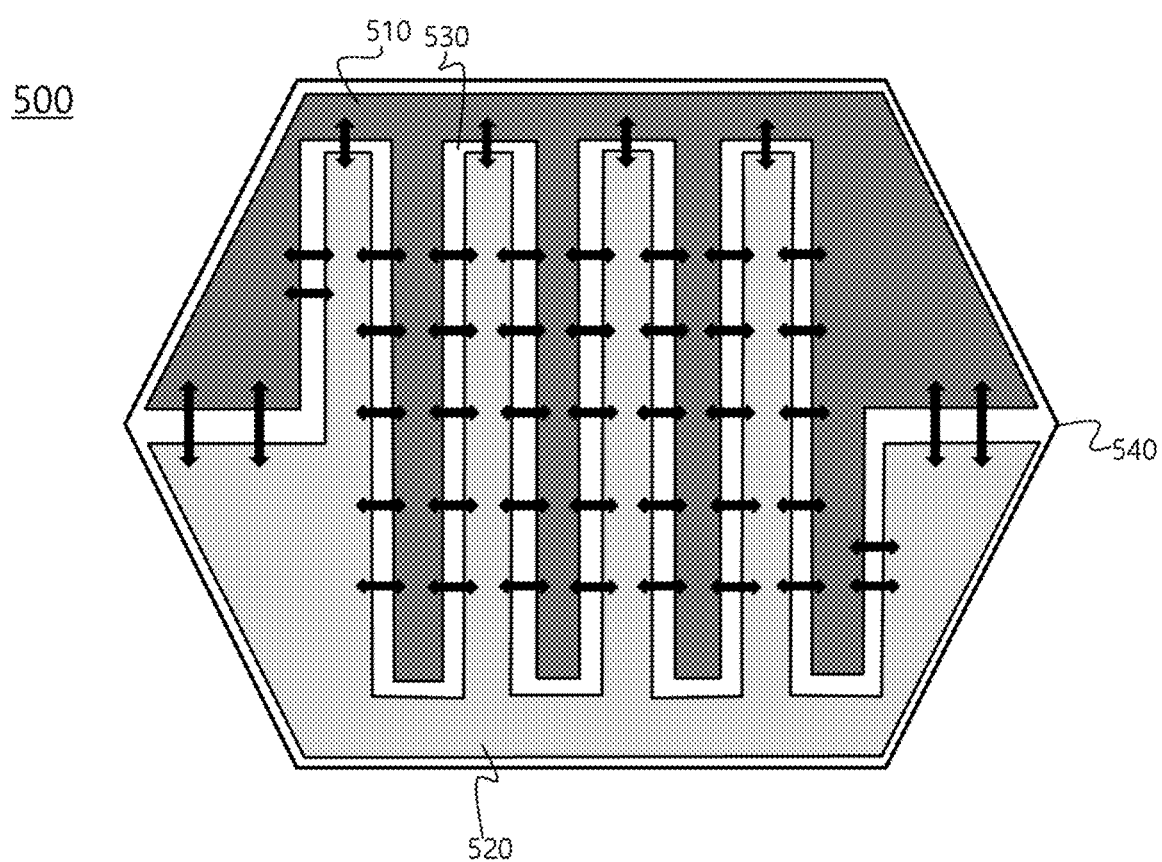
FIG. 7 is a see-through top view showing a capacitor according to a further embodiment of the present invention.

FIG. 7 shows a capacitor 500 having a hexagonal planar shape.

Referring to FIG. 7, a single positive electrode 510 and a single negative electrode 520 are arranged in the state in which a dielectric 530 is interposed between the positive electrode 510 and the negative electrode 520, and each of the positive electrode 510 and the negative electrode 520 is provided with a plurality of deletion portions such that the positive electrode 510 and the negative electrode 520 can be engaged with each other in the form of sawteeth, similarly to FIG. 5. The electrochemical reaction occurring in this structure is indicated by red arrows.

That is, the capacitor 500 shown in FIG. 7 is different in structure from the capacitors previously described in that the planar shape of the capacitor 500 is hexagonal. Based on this structure, therefore, the positive electrode 510 and the negative electrode 520 are formed so as to correspond to the shape of the capacitor 500. Although a hexagonal structure is shown in FIG. 7, the present invention is not limited thereto. The capacitor 500 may be formed so as to have any of various structures.

Although the external structure of the capacitor is not shown in FIG. 7, the positive electrode 510 and the negative electrode 520 are connected respectively to an external positive electrode input and output terminal and an external negative electrode input and output terminal, each of which protrudes outward from a case 540.

As is apparent from the above description, the capacitor according to the present invention is configured such that at least one positive electrode and at least one negative electrode are arranged in the horizontal direction, whereby the possibility of a short circuit is reduced. Consequently, the positive electrode and the negative electrode may be separated from each other merely by providing a gap therebetween without interposing a separator therebetween. As a result, the distance between the positive electrode and the negative electrode may be further reduced, whereby the reaction speed is further increased. In addition, the positive electrode and the negative electrode are formed such that the positive electrode and the negative electrode have a complementary pattern. As a result, the reaction area between the positive electrode and the negative electrode is increased, whereby reaction efficiency is maximized.

In accordance with one aspect of the present invention, the above and other features may be accomplished by the provision of a capacitor including an electrode assembly, including at least one positive electrode, at least one negative electrode, and at least one dielectric or separator interposed between the positive electrode and the negative electrode, and a case for receiving the electrode assembly, wherein the electrode assembly is configured such that the positive electrode, the negative electrode, and the dielectric or the separator are arranged in a horizontal direction, which is perpendicular to the thickness direction of the electrode assembly, and such that the positive electrode and the negative electrode have a complementary pattern.

Here, the thickness direction of the electrode assembly may a direction that is perpendicular to the ground, and therefore the horizontal direction is a direction that is parallel to the ground.

In the capacitor according to example embodiments of the present invention, the positive electrode and the negative electrode may be arranged in the horizontal direction, unlike a related art structure, in which the positive electrode and the negative electrode are stacked in the vertical direction. Consequently, it is possible to reduce the thickness of the capacitor to a desired size. For example, the capacitor may be manufactured so as to have a thickness of 1 mm or less.

Also, in the capacitor according to embodiments of the present invention, the positive electrode and the negative electrode may be arranged side by side in the form of a simple rectangle or square such that each of the positive electrode and the negative electrode has only a single facing portion within a predetermined volume, and in addition, the positive electrode and the negative electrode have a complementary pattern in order to further increase the reaction area therebetween. Consequently, the number of reaction points may be increased and the reaction area between the positive electrode and the negative electrode may be increased, whereby output efficiency may be maximized.

For example, the complementary pattern may be configured such that the positive electrode and the negative electrode have at least one complementary deletion portion and such that each of the positive electrode and the negative electrode has at least one first facing portion that faces a first direction and at least one second facing portion that faces a second direction.

Here, that a facing portion faces one direction may refer to facing portions that face each other in one direction. Consequently, the facing portions are perpendicular to the direction in which the facing portions face each other.

In addition, the first direction and the second direction are set to directions having predetermined angles with respect to the horizontal direction, rather than the thickness direction of the capacitor.

The angle defined between the first direction and the second direction is not particularly restricted. The first direction and the second direction may be set so as to have a predetermined angle therebetween. The angle defined between the first direction and the second direction may be, for example, 10 to 90 degrees, and in a further example 60 to 90 degrees. For example, the angle defined between the first direction and the second direction may be 90 degrees.

If the angle defined between the first direction and the second direction is less than 10 degrees, the improvement to output efficiency is insignificant, in the same manner as in the case in which no deletion portion is formed, which is undesirable. On the other hand, when the angle defined between the first direction and the second direction is increased, the area of the regions that are distant from the facing portions of the electrodes between which an electrochemical reaction occurs is decreased, whereas the reaction area between the positive electrode and the negative electrode is increased. Consequently, the angle defined between the first direction and the second direction may be set as described above.

The term "deletion portion" may refer to a shape in which a portion is cut from a rectangle, not a rectangular structure, as will be described below. The complementary pattern in the structure having the deletion portion may refer to a shape in which the positive electrode and the negative electrode are inserted into the deletion portion in the form of a block in the state in which the positive electrode and the negative electrode face each other, whereby the volume of the positive electrode and the negative electrode is minimized.

Meanwhile, an electrochemical reaction may occur between the first facing portions of the positive electrode and the negative electrode and between the second facing portions of the positive electrode and the negative electrode.

In the capacitor according to example embodiments of the present invention having the structure described above, therefore, the positive electrode and the negative electrode may be arranged in the horizontal direction such that the capacitor can be manufactured so as to have an ultra-thin film structure. Also, to prevent a reduction in output efficiency that may occur in this case, the positive electrode and the negative electrode may be formed such that the positive electrode and the negative electrode have a complementary pattern. Consequently, the substantial area between the positive electrode and the negative electrode may be increased within the same volume, whereby output efficiency may be maximized.

The distance between the facing portions of the positive electrode and the negative electrode having the complementary pattern may be 10 μm to 1000 μm.

If the distance between the facing portions of the positive electrode and the negative electrode is too small, a short circuit may occur, e.g., the safety of the capacitor may be reduced. On the other hand, if the distance between the facing portions of the positive electrode and the negative electrode is too large, the reaction length is increased, whereby the reaction speed is considerably lowered, which is undesirable.

Meanwhile, electrodes located at opposite ends of the electrode assembly may be a positive electrode and a negative electrode, which may be connected to external input and output terminals of the capacitor.

The electrode assembly of the capacitor according to the present invention may include a single positive electrode, a single negative electrode, and a dielectric or a separator interposed between the positive electrode and the negative electrode. Alternatively, the electrode assembly may include two or more positive electrodes, two or more negative electrodes, and two or more dielectrics or separators. In this case, electrodes located between the positive electrode and the negative electrode located at opposite ends of the electrode assembly may not be connected to the external input and output terminals of the capacitor.

That is, the capacitor according to example embodiments of the present invention may be configured to have a structure in which only electrodes located at the opposite ends of the electrode assembly are connected to the external input and output terminals of the capacitor and in which current in the capacitor flows to the outside via the external input and output terminals, which are connected to the electrodes located at opposite ends of the electrode assembly.

In the capacitor according to example embodiments of the present invention, only the electrodes located at opposite ends of the electrode assembly may be connected to the outside, and electrodes located between the outermost electrodes may be separated from each other in the state in which a dielectric or a separator is interposed therebetween, unlike the electrode assembly of a battery configured to have a structure in which electrodes are stacked and electrode tabs protruding from the respective electrodes are coupled to each other.

Also, in the case in which the electrode assembly includes two or more positive electrodes, two or more negative electrodes, and two or more dielectrics or separators, as described above, one positive electrode and one negative electrode constituting a basic unit may have a complementary pattern, and one positive electrode and one negative electrode between neighboring basic units may or may not have a complementary pattern. That is, the present invention is not limited thereto.

In addition, the complementary pattern of the basic unit may equally apply to several basic units, or a plurality of basic units may have different complementary patterns. That is, the present invention is not limited thereto. For example, a single positive electrode and a single negative electrode may constitute a basic unit, and a plurality of basic units may be repeatedly arranged in the horizontal direction.

In the case in which the basic units are repeatedly arranged, process efficiency may be improved, and positional deviation in the basic units may not be large, which may be more desirable.

Also, in the case in which such a repetitive pattern is formed within the same volume, as described above, the reaction area between the electrodes may be further increased, and the distance between the electrodes may be decreased, whereby the reaction speed and the reaction efficiency may be more maximized.

In one example, the capacitor according to the present invention may be manufactured so as to have various planar shapes.

For example, the capacitor may be formed to have a polygonal planar shape. However, the shape of the capacitor is not particularly restricted. For example, the capacitor may be formed to have a triangular, quadrangular, pentagonal, or hexagonal shape. Furthermore, the capacitor may be formed to have a star shape. Alternatively, the capacitor may be configured to have a structure in which a portion of the outer circumferential surface of the capacitor is curved. That is, the structure of the capacitor is not particularly restricted.

The electrode assembly may be formed to have various shapes in response to the structure of the capacitor. In addition, each of the positive electrode and the negative electrode may be formed to have a shape corresponding to the outer surface of the capacitor.

Here, the planer shape of the capacitor means the shape of the capacitor when the capacitor is viewed from above in the state in which the capacitor is placed on the ground.

Meanwhile, in the capacitor according to the present invention, no additional separator may be interposed between the positive electrode and the negative electrode, but a dielectric may be interposed between the positive electrode and the negative electrode.

Here, the dielectric may be air. That is, empty space may be provided between the positive electrode and the negative electrode.

In a related art electrochemical capacitor, a positive electrode and a negative electrode are stacked in the state in which a separator is interposed therebetween and a liquid-state electrolytic solution is used in order to prevent the occurrence of a short circuit between the positive electrode and the negative electrode. According to the present invention, however, the positive electrode and the negative electrode are not stacked in the vertical direction but are arranged in the horizontal direction. As a result, no short circuit occurs between the positive electrode and the negative electrode, and therefore empty space (e.g., air) may be simply provided between the positive electrode and the negative electrode. Consequently, it is possible to manufacture a compact capacitor that has a higher reaction speed.

The kind of the capacitor is not particularly restricted. For example, the capacitor may be an electric double layer capacitor, which accumulates electricity through electrostatic adsorption and separation of ions, a pseudo capacitor, which accumulates electricity through an oxidation-reduction reaction, or a hybrid capacitor, which has asymmetric electrodes. For example, the hybrid capacitor may be a Li-ion capacitor or a Na-ion capacitor, which uses intercalation of ions, such as Li or Na.

In accordance with another aspect of the present invention, there is provided a secondary battery pack including the capacitor as an auxiliary power source.

In accordance with a further aspect of the present invention, there is provided a device including the capacitor. The device may be selected from among a laptop computer, a mobile phone, a camera, a toy, a portable display player (PDP), a portable multimedia player (PMP), an MP3 player, a digital still camera (DSC), a digital video recorder (DVR), a smartphone, a camcorder, an audio system, a video system, an uninterruptible power supply (UPS), a vehicle, an electric vehicle, a hybrid electric vehicle, and a power storage device.

The structure and manufacturing method of the device are well known in the art to which the present invention pertains, and therefore a detailed description thereof will be omitted.

As is apparent from the above description, the capacitor according to the present invention may be configured to have a structure in which a positive electrode and a negative electrode, which constitute the capacitor, are arranged in a horizontal direction, and in which the positive electrode and the negative electrode have a complementary pattern, e.g., each of the positive electrode and the negative electrode has at least one first facing portion that faces a first direction and at least one second facing portion that faces a second direction, whereby the area between the opposite electrodes is increased such that the number of reaction points is increased and thus the output efficiency of the capacitor is maximized within a limited volume.

The drawings show examples of the present invention, and therefore the present invention is not limited thereto, as long as the positive electrode and the negative electrode in the capacitor have a deletion portion, by which the reaction area between the positive electrode and the negative electrode is increased.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A capacitor comprising:
an electrode assembly comprising at least one positive electrode, at least one negative electrode, and at least one dielectric interposed between the positive electrode and the negative electrode; and
a case for receiving the electrode assembly,
wherein each positive electrode and each negative electrode has an L-shape with one straight portion in a horizontal direction and another straight portion in a width direction perpendicular to the horizontal direction, the horizontal and the width directions being perpendicular to a thickness direction of the electrode assembly,
wherein one positive electrode and one negative electrode constitute a basic unit, and
wherein the positive electrode and the negative electrode of each basic unit are arranged to have a complementary pattern such that each basic unit has a rectangular shape in a plan view with respect to the thickness direction.

2. The capacitor according to claim 1, wherein an electrochemical reaction occurs between first facing portions of the positive electrode and the negative electrode, and between second facing portions of the positive electrode and the negative electrode.

3. The capacitor according to claim 1, wherein the electrode assembly comprises two or more positive electrodes, two or more negative electrodes, and two or more dielectrics or separators.

4. The capacitor according to claim 3, wherein a plurality of basic units is arranged in the horizontal direction.

5. The capacitor according to claim 4, wherein electrodes located at opposite ends of the electrode assembly are a positive electrode and a negative electrode, which are connected to external input and output terminals of the capacitor.

6. The capacitor according to claim 3, wherein electrodes located between the electrodes located at the opposite ends of the electrode assembly are not connected to the external input and output terminals of the capacitor.

7. The capacitor according to claim 1, wherein the dielectric is air.

8. The capacitor according to claim 1, wherein the capacitor has a thickness of 1 mm or less.

9. A secondary battery pack comprising a capacitor according to claim 1 as an auxiliary power source.

* * * * *